United States Patent
Park et al.

(10) Patent No.: US 12,478,953 B2
(45) Date of Patent: Nov. 25, 2025

(54) MOLDED CATALYST, PRODUCTION METHOD FOR SAME, AND METHOD FOR PRODUCING CYCLIC KETONE USING SAME

(71) Applicant: KOREA KUMHO PETROCHEMICAL CO., LTD., Seoul (KR)

(72) Inventors: Ji Won Park, Daejeon (KR); Kyoungho Row, Daejeon (KR); Jin Woo Park, Sejong-si (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 825 days.

(21) Appl. No.: 17/778,644

(22) PCT Filed: Apr. 8, 2021

(86) PCT No.: PCT/KR2021/004437
§ 371 (c)(1),
(2) Date: May 20, 2022

(87) PCT Pub. No.: WO2022/092457
PCT Pub. Date: May 5, 2022

(65) Prior Publication Data
US 2022/0395823 A1    Dec. 15, 2022

(30) Foreign Application Priority Data

Oct. 27, 2020  (KR) ........................ 10-2020-0140233

(51) Int. Cl.
*B01J 21/04*  (2006.01)
*B01J 21/10*  (2006.01)
(Continued)

(52) U.S. Cl.
CPC ............... *B01J 21/04* (2013.01); *B01J 21/10* (2013.01); *B01J 35/36* (2024.01); *B01J 35/40* (2024.01);
(Continued)

(58) Field of Classification Search
CPC ... B01J 21/04; B01J 23/02; B01J 23/14; B01J 23/34; B01J 23/70–80; B01J 23/8892;
(Continued)

(56) References Cited

U.S. PATENT DOCUMENTS 4,305,842 A * 12/1981 Asakawa ................. B01J 23/80
                                                  502/343
4,327,188 A *  4/1982 Endo ..................... C04B 35/478
                                                  428/116
(Continued)

FOREIGN PATENT DOCUMENTS

CN       101698147 A      4/2010
CN       102258994 A      11/2011
(Continued)

OTHER PUBLICATIONS

Zhang Zhiquan et al., Architectural Decoration Engineering Technical Manual, vol. 1, Dec. 31, 1998, Heilongjiang Science and Technology Press, Harbin, China.
(Continued)

*Primary Examiner* — Cam N. Nguyen
(74) *Attorney, Agent, or Firm* — NKL Law; Jae Youn Kim

(57) ABSTRACT

A catalyst molded body, a production method thereof and a method for preparing cyclic ketone using the same, including: (a) producing a mixed powder including a catalyst powder and a binder; (b) producing a slurry by mixing an
(Continued)

aqueous alkali hydroxide solution with the mixed powder; and obtaining a catalyst molded body by molding and heat-treating the slurry.

5 Claims, 4 Drawing Sheets

(51) Int. Cl.

| | |
|---|---|
| *B01J 23/02* | (2006.01) |
| *B01J 23/14* | (2006.01) |
| *B01J 23/34* | (2006.01) |
| *B01J 23/70* | (2006.01) |
| *B01J 23/80* | (2006.01) |
| *B01J 35/36* | (2024.01) |
| *B01J 35/40* | (2024.01) |
| *B01J 35/50* | (2024.01) |
| *B01J 35/55* | (2024.01) |
| *B01J 37/00* | (2006.01) |
| *B01J 37/08* | (2006.01) |
| *C07C 49/603* | (2006.01) |

(52) U.S. Cl.
CPC ........... *B01J 35/55* (2024.01); *B01J 37/0045* (2013.01); *B01J 37/08* (2013.01); *C07C 49/603* (2013.01); *B01J 2523/22* (2013.01); *B01J 2523/31* (2013.01); *C07C 2521/04* (2013.01); *C07C 2521/10* (2013.01); *C07C 2601/16* (2017.05)

(58) Field of Classification Search
CPC .... B01J 23/8946; B01J 23/8953; B01J 35/40; B01J 37/0045; B01J 37/08; C07C 49/603
USPC .......................................................... 502/300
See application file for complete search history.

(56) References Cited

U.S. PATENT DOCUMENTS

| | | | | |
|---|---|---|---|---|
| 4,804,562 A * | 2/1989 | Ferguson | ................ | B22C 9/10 427/199 |
| 4,970,191 A | 11/1990 | Schutz | | |
| 5,153,156 A | 10/1992 | Schutz et al. | | |
| 5,536,694 A * | 7/1996 | Schuetz | ................ | B01J 25/02 502/301 |
| 5,639,917 A * | 6/1997 | Darsow | ................ | C07C 45/62 568/318 |
| 5,746,957 A * | 5/1998 | Fanelli | ................ | C04B 35/6303 419/36 |
| 5,756,864 A * | 5/1998 | Darsow | ................ | C07C 35/12 568/829 |
| 5,861,521 A * | 1/1999 | Darsow | ................ | C11C 3/126 502/103 |
| 5,962,367 A * | 10/1999 | Shen | ................ | B01J 37/0018 502/304 |
| 6,020,472 A * | 2/2000 | Darsow | ................ | C07H 15/08 536/124 |
| 6,162,758 A * | 12/2000 | Brocker | ................ | B01J 23/06 502/340 |
| 6,660,243 B1 * | 12/2003 | Proft | ................ | B01J 20/28042 423/610 |
| 6,787,677 B2 * | 9/2004 | Koch | ................ | B01J 23/72 502/103 |
| 6,926,880 B2 * | 8/2005 | Holzle | ................ | B01J 37/14 252/373 |
| 7,148,179 B2 * | 12/2006 | Lansink Rotgerink | ................ | B01J 37/0018 502/239 |
| 7,387,983 B2 * | 6/2008 | Holzle | ................ | C01B 3/326 502/343 |
| 7,759,530 B2 * | 7/2010 | Houssin | ................ | B01J 37/03 568/861 |
| 8,304,367 B2 | 11/2012 | Takahashi et al. | | |
| 8,962,508 B2 * | 2/2015 | Heidemann | ................ | B01J 37/06 564/485 |
| 9,943,831 B2 * | 4/2018 | Park | ................ | B01J 35/30 |
| 10,507,456 B2 * | 12/2019 | Park | ................ | B01J 35/40 |
| 10,604,459 B2 * | 3/2020 | Kim | ................ | B01J 37/0207 |
| 10,780,428 B2 * | 9/2020 | Heidemann | ................ | B01J 35/50 |
| 11,000,833 B2 * | 5/2021 | Werner | ................ | B01J 35/615 |
| 2008/0071120 A1 * | 3/2008 | Houssin | ................ | B01J 23/002 568/864 |
| 2010/0284877 A1 * | 11/2010 | DiFrancesco | ............ | B01J 23/30 423/239.1 |
| 2013/0190541 A1 * | 7/2013 | Du Preez | ................ | C07C 17/25 570/220 |
| 2019/0241440 A1 * | 8/2019 | Shenhar | ................ | C04B 35/632 |

FOREIGN PATENT DOCUMENTS

| | | |
|---|---|---|
| JP | 46-011097 B | 3/1971 |
| JP | 03-80936 A | 4/1991 |
| JP | 09169687 A | 6/1997 |
| JP | 2009509728 A | 3/2009 |
| JP | 2009-233662 A | 10/2009 |
| JP | 2016073975 A | 5/2016 |
| KR | 10-2015-0058012 A | 5/2015 |
| KR | 10-1602405 B1 | 3/2016 |

OTHER PUBLICATIONS

C.P. Kelkar and A.A. Schutz, "Efficient hydrotalcite-based catalyst for acetone condensation to a-isophorone-scale up aspects and process development" Applied Clay Science 13 (1998), pp. 417-432.

\* cited by examiner

//MOLDED CATALYST, PRODUCTION METHOD FOR SAME, AND METHOD FOR PRODUCING CYCLIC KETONE USING SAME

TECHNICAL FIELD

Provided are a catalyst, a production method thereof and a method for producing cyclic ketone using the same.

BACKGROUND ART

Non-cyclic ketones such as acetone are in an overproduced state, and a technology for producing a high value-added material using the same has been developed. Among acetone derivatives, isophorone (IPH) is used as an intermediate, a solvent, and the like for various chemical products.

Although various methods for producing isophorone in the related art have been introduced, a batch process using a homogeneous catalyst, which corresponds to the most common method, has a problem in that the process is complicated because an aldol condensation reaction is performed by mixing acetone and the catalyst, and then isophorone is produced by neutralization, filtration and distillation. Further, since the temperature is adjusted for each batch and waste is generated by the neutralized salt of the catalyst, a process cost is high.

Although a technique for omitting the neutralization process using a solid heterogeneous catalyst that can be recovered has been attempted, this also has a problem in that it is difficult to recover the catalyst as particles become too small because a filtration process for recovering is essential, process conditions at each batch need to be controlled, and the mechanical strength of the catalyst is insufficient.

Although applying a continuous process using a fixed-bed reactor enables isophorone to be continuously produced and the process to be simplified, catalysts in the related art have insufficient stability and mechanical strength, so as a reaction proceeds, the service life of the catalyst is drastically reduced, thereby making it difficult to produce a product.

DISCLOSURE

Technical Problem

An aspect of the present specification has been made in an effort to solve the above-described problems in the related art, and an object thereof is to provide a catalyst molded body having excellent mechanical strength and catalyst stability and a small amount of by-products produced, and a production method thereof.

Another object thereof is to produce cyclic ketone by a simplified process using the above-described catalyst molded body, thereby reducing the amount of energy used in an isolation and purification process, extending an operation time, and improving the yield.

Technical Solution

According to an aspect of the present specification, provided is a method for producing a catalyst molded body, the method including: (a) producing a mixed powder including a catalyst powder and a binder; (b) producing a slurry by mixing a first aqueous solution with the mixed powder; and (c) obtaining a catalyst molded body by molding and heat-treating the slurry.

In an exemplary embodiment, the catalyst may be at least one oxide selected from the group consisting of magnesium, aluminum, manganese, iron, cobalt, nickel, copper and zinc.

In an exemplary embodiment, the catalyst may have a molar ratio (Mg/Al) of magnesium and aluminum of 1.0 to 5.0.

In an exemplary embodiment, the binder may include an inorganic binder in an amount of 1 to 20 parts by weight based on 100 parts by weight of the catalyst molded body.

In an exemplary embodiment, the binder may include an organic binder in an amount of 0.1 to 4.5 parts by weight based on 100 parts by weight of the catalyst molded body.

In an exemplary embodiment, the first aqueous solution may include alkali hydroxide in an amount of 0.1 to 1 part by weight based on 100 parts by weight of the catalyst molded body.

Another aspect of the present specification provides a catalyst molded body produced by the above-described method for producing a catalyst molded body.

In an exemplary embodiment, a compressive strength may be 10 N or more.

In an exemplary embodiment, a diameter may be 1.0 to 10.0 mm.

Still another aspect of the present specification provides a method for producing cyclic ketone, the method including: (i) preparing a reactant including non-cyclic ketone; and (ii) reacting the reactant with the above-described catalyst molded body in a reactor.

In an exemplary embodiment, Step (ii) may be performed by a batch-type or continuous-type process.

In an exemplary embodiment, the method may further include: (iii) isolating cyclic ketone from the product in Step (ii) after Step (ii).

In an exemplary embodiment, the raw material isolated in Step (iii) may be recycled by the reactant in Step (i).

Advantageous Effects

According to an aspect of the present specification, it is possible to produce a catalyst molded body having excellent mechanical strength and catalyst stability and a small amount of by-products produced.

According to another aspect, cyclic ketone can be produced by a simplified process using the above-described catalyst molded body, thereby reducing the amount of energy used in an isolation and purification process, extending an operation time, and improving the yield.

The effects of the present invention are not limited to the aforementioned effects and should be understood to include all possible effects deduced from the configuration of the invention described in the detailed description or the claims of the present invention.

MODES OF THE INVENTION

Figure 1:
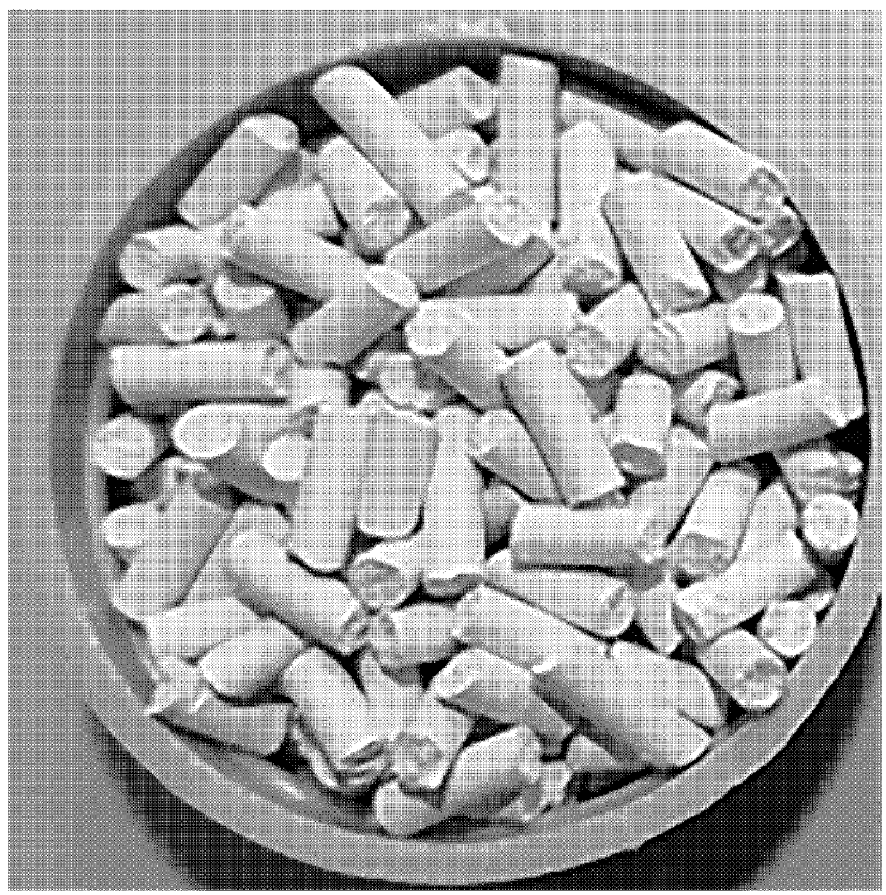
FIG. 1 illustrates an example of a catalyst molded body according to the present specification.

Hereinafter, the present invention will be described with reference to the accompanying drawings. However, the present invention can be realized in various different forms, and is not limited to the embodiments described herein. In addition, in order to clearly describe the present invention, portions that are not related to the description are omitted in the drawings, and like reference numerals are added to like portions throughout the specification.

Throughout the specification, when one part is "connected" to another part, this includes not only a case where they are "directly connected to each other", but also a case where they are "indirectly connected to each other" with another member interposed therebetween. Further, when one part "includes" one constituent element, unless otherwise specifically described, this does not mean that another constituent element is excluded, but means that another constituent element may be further included.

When a range of numerical values is described in the present specification, the value has the precision of significant figures provided according to the standard rules in chemistry for significant figures, unless a specific range thereof is stated otherwise. For example, 10 includes a range of 5.0 to 14.9, and the number 10.0 includes a range of 9.50 to 10.49.

Hereinafter, the Examples of the present invention will be described in detail with reference to the accompanying drawings.

Method for Producing Catalyst Molded Body

A method for producing a catalyst molded body according to an aspect of the present specification may include: (a) producing a mixed powder including a catalyst powder and a binder; (b) producing a slurry by mixing a first aqueous solution with the mixed powder; and (c) obtaining a catalyst molded body by molding and heat-treating the slurry.

Step (a) may be a step of producing a mixed powder by mixing a binder with a catalyst powder having activity for producing a molded body having excellent mechanical strength, which can also be applied to a continuous-type process.

The catalyst may be at least one oxide selected from the group consisting of magnesium, aluminum, manganese, iron, cobalt, nickel, copper and zinc. For example, the catalyst may include magnesium and aluminum in a range of molar ratio (Mg/Al) of 1.0 to 5.0, for example, 1.0, 1.5, 2.0, 2.5, 3.0, 3.5, 4.5, 5.0 or between two values thereof, but the range is not limited thereto. For example, when the Mg/Al molar ratio falls within a range of 1.0 to 3.0, the selectivity of cyclic ketone may be 60% or more. Examples of such catalysts include at least one of metal oxides or metal hydroxides such as hydrotalcite, quintinite, and fougerite.

The binder may include an inorganic binder in a range of 1 to 20 parts by weight, for example, 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, 20 parts by weight or between two values thereof, based on 100 parts by weight of the catalyst molded body. The inorganic binder may be at least one selected from, for example, calcium oxide (CaO), aluminum oxide ($Al_2O_3$), and boehmite (AlOOH), but is not limited thereto.

The binder may include an organic binder in a range of 0.1 to 4.5 parts by weight, for example, 0.1 part by weight, 0.2 part by weight, 0.3 part by weight, 0.4 part by weight, 0.5 part by weight, 0.6 part by weight, 0.7 part by weight, 0.8 part by weight, 0.9 part by weight, 1.0 part by weight, 1.1 parts by weight, 1.2 parts by weight, 1.3 parts by weight, 1.4 parts by weight, 1.5 parts by weight, 1.6 parts by weight, 1.7 parts by weight, 1.8 parts by weight, 1.9 parts by weight, 2.0 parts by weight, 2.1 parts by weight, 2.2 parts by weight, 2.3 parts by weight, 2.4 parts by weight, 2.5 parts by weight, 2.6 parts by weight, 2.7 parts by weight, 2.8 parts by weight, 2.9 parts by weight, 3.0 parts by weight, 3.1 parts by weight, 3.2 parts by weight, 3.3 parts by weight, 3.4 parts by weight, 3.5 parts by weight, 3.6 parts by weight, 3.7 parts by weight, 3.8 parts by weight, 3.9 parts by weight, 4.0 parts by weight, 4.1 parts by weight, 4.2 parts by weight, 4.3 parts by weight, 4.4 parts by weight, 4.5 parts by weight or between two values thereof, based on 100 parts by weight of the catalyst molded body. The organic binder may be at least one selected from, for example, hydroxy methyl cellulose (MC), carboxy methyl cellulose sodium salt, and acetic acid, but is not limited thereto.

The binder may include an inorganic binder and an organic binder having the above-described contents, respectively.

According to the composition and content of the catalyst and binder described above, the mechanical properties of the catalyst molded body and the yield and selectivity of the cyclic ketone can be improved, and simultaneously, the by-product yield can be reduced.

Step (b) may produce a slurry form in which each component is easily dispersed and molded by mixing a first aqueous solution with the mixed powder.

The first aqueous solution may include alkali hydroxide in an amount of 0.1 to 1 part by weight based on 100 parts by weight of the catalyst molded body, and the content of the alkali hydroxide may be in a range of, for example, 0.1 part by weight, 0.2 part by weight, 0.3 part by weight, 0.4 part by weight, 0.5 part by weight, 0.6 part by weight, 0.7 part by weight, 0.8 part by weight, 0.9 part by weight, 1.0 part by weight or between two values thereof.

The alkali hydroxide is an enhancer, and can improve the selectivity of the catalyst for cyclic ketone and reduce the yield of by-products.

Step (c) may include: (c1) pressure-molding the slurry; (c2) primarily drying the pressure-molded slurry at 15 to 35° C. for 1 to 48 hours; (c3) secondarily drying the pressure-molded slurry at 90 to 120° C. for 1 to 24 hours; and (c4) firing the pressure-molded slurry at 350 to 650° C. for 1 to 10 hours.

Step (c1) is a step of forming the catalyst molded body in a predetermined form, and the compressive strength of the molded body may be improved by pressurization. The pressure molding may be performed by an extruder, a roller press, and the like.

Step (c2) may remove moisture by primarily performing drying at room temperature, and may be performed for, for example, 1 hour, 6 hours, 12 hours, 18 hours, 24 hours, 30 hours, 36 hours, 42 hours, 48 hours, or hours in a range between two values thereof.

Step (c3) performs secondary drying under high temperature conditions, and may be performed at 90° C., 95° C., 100° C., 105° C., 110° C., 115° C., 120° C. or a temperature in a range between two values thereof for 1 hour, 4 hours, 8 hours, 12 hours, 16 hours, 20 hours, 24 hours or hours in a range between two values thereof.

Step (c4) may remove moisture and the organic binder by performing firing at 350° C., 375° C., 400° C., 425° C., 450° C., 475° C., 500° C., 525° C., 550° C., 575° C., 600° C., 625° C., 650° C. or a temperature in a range between two values thereof for 1 hour, 2 hours, 3 hours, 4 hours, 5 hours, 6 hours, 7 hours, 8 hours, 9 hours, 10 hours or hours in a range between two values thereof.

When the catalyst molded body 7 is dried and fired step by step under different temperature conditions as described in (c2) to (c4), the removal rate of moisture and the like may be adjusted to improve the mechanical strength of the catalyst molded body and maximize an area where catalysis is possible.

Catalyst Molded Body

The catalyst molded body according to another aspect of the present specification may be produced by the above-described method for producing a catalyst-molded body. FIG. 1 illustrates an example of a catalyst molded body according to an exemplary embodiment of the present specification.

The catalyst molded body may have a compressive strength of 10 N or more. The compressive strength may be, for example, 10 N, 11 N, 12 N, 13 N, 14 N, 15 N, 16 N, 17 N, 18 N, 19 N, 20 N, 21 N, 22 N, 23 N, 24 N, 25 N, 26 N, 27 N, 28 N, 29 N, 30 N, 31 N, 32 N, 33 N, 34 N, 35 N, 36 N, 37 N, 38 N, 39 N, 40 N, 41 N, 42 N, 43 N, 44 N, 45 N, 46 N, 47 N, 48 N, 49 N, 50 N, 51 N, 52 N, 53 N, 54 N, 55 N, 56 N, 57 N, 58 N, 59 N, 60 N, 61 N, 62 N, 63 N, 64 N, 65 N, 66 N, 67 N, 68 N, 69 N, 70 N, 71 N, 72 N, 73 N, 74 N, 75 N, 76 N, 77 N, 78 N, 79 N, 80 N, 81 N, 82 N, 83 N, 84 N, 85 N, 86 N, 87 N, 88 N, 89 N, 90 N, 91 N, 92 N, 93 N, 94 N, 95 N, 96 N, 97 N, 98 N, 99 N, 100 N or in a range between two values thereof. The catalyst molded body may have excellent mechanical strength due to the combination with the binder, the enhancer, and the drying process.

The catalyst molded body may have a diameter of 1.0 to 10.0 mm, for example, 1.0 mm, 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, 10.0 mm or in a range between two values thereof.

Since the catalyst molded body may improve the rate of the aldol condensation reaction, and also has sufficient mechanical strength and stability, the catalyst molded body may be applied to a fixed-bed catalyst reactor.

In addition, the catalyst molded body has excellent stability even at a high temperature of 200 to 350° C. and even though the reaction is performed for a long time, the activity is maintained, and thus the catalyst molded body may be suitably applied to a continuous-type reactor.

Method for Producing Cyclic Ketone

The method for producing cyclic ketone according to another aspect of the present specification may include: (i) preparing a reactant including non-cyclic ketone; and (ii) reacting the reactant with the above-described catalyst molded body in a reactor.

Figure 2:
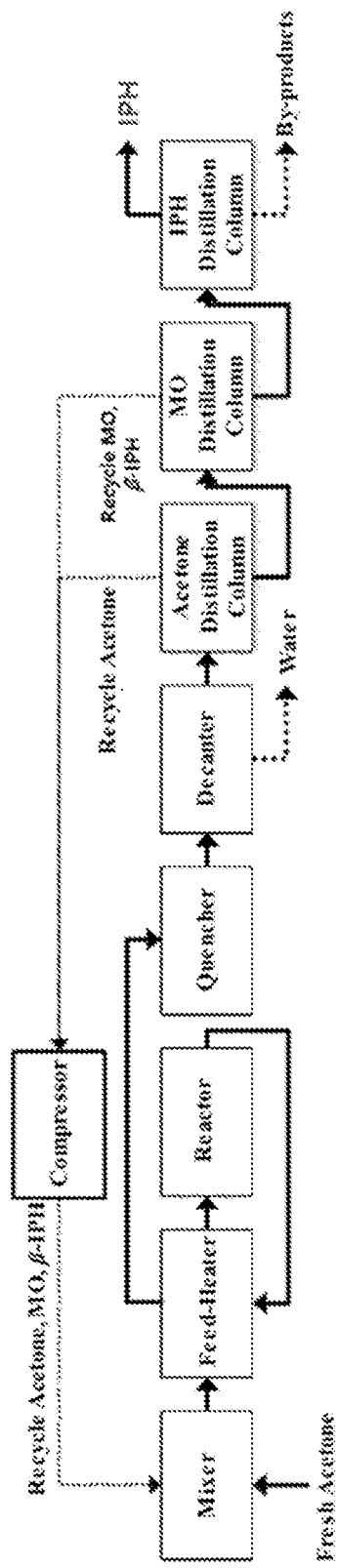
FIG. 2 illustrates a schematic view of an example of a reactor to which the catalyst molded body according to the present specification is applied.

FIG. 2 illustrates an example of a reactor to which the method for producing cyclic ketone is applied.

Referring to FIG. 2, Step (i) may mix a reactant including non-cyclic ketone in a mixer, and then heat the reactant in a pre-heater.

The reaction in Step (ii) is a heterogeneous catalytic reaction and may be performed by a batch-type or continuous-type process. A method for producing cyclic ketone in the related art has a problem in that it is difficult to perform the method by a continuous-type process because the stability and mechanical strength of the catalyst are insufficient, so a homogeneous catalytic process, in which a reactant and a catalyst are mixed and introduced into a batch-type reactor, and then neutralization and filtration processes are performed, was used. When the catalyst molded body having excellent service life is used, both a batch-type process using a slurry reactor and a continuous-type process using a fixed-bed reactor can be applied.

When the reaction in Step (ii) is performed by a batch-type process, the reactant prepared in Step (i) is mixed with the above-described catalyst molded body, and then an aldol condensation reaction is performed in a batch-type reactor, the catalyst molded body is recovered, and the product may be obtained by distillation.

When the reaction in Step (ii) is performed by a continuous-type process, the reactant prepared in Step (i) may be introduced into a reactor packed with the above-described catalyst molded body, and the reactor may perform a reaction at 200 to 350° C., for example, 200° C., 210° C., 220° C., 230° C., 240° C., 250° C., 260° C., 270° C., 280° C., 290° C., 300° C., 310° C., 320° C., 330° C., 340° C., 350° C. or a temperature in a range between two values thereof. The reactor may be packed with a catalyst molded body so as to satisfy a liquid hourly space velocity (LHSV) condition of 0.15 to 1.50 h−1, for example, 0.15 $h^{-1}$, 0.20 $h^{-1}$, 0.25 $h^{-1}$, 0.30 $h^{-1}$, 0.35 $h^{-1}$, 0.40 $h^{-1}$, 0.45 $h^{-1}$, 0.50 l/h, 0.55 $h^{-1}$, 0.60 $h^{-1}$, 0.65 $h^{-1}$, 0.70 $h^{-1}$, 0.75 $h^{-1}$, 0.80 $h^{-1}$, 0.85 $h^{-1}$, 0.90 $h^{-1}$, 0.95 $h^{-1}$, 1.00 $h^{-1}$, 1.05 $h^{-1}$, 1.10 $h^{-1}$, 1.15 $h^{-1}$, 1.20 $h^{-1}$, 1.25 $h^{-1}$, 1.30 $h^{-1}$, 1.35 $h^{-1}$, 1.40 $h^{-1}$, 1.45 $h^{-1}$, 1.50 $h^{-1}$ or in a range between two values thereof. When the liquid hourly space velocity is excessively low, the selectivity of a target product may be reduced, and when the liquid hourly space velocity is excessively high, the reaction is insufficiently performed, and thus, the step may be uneconomical due to a low process conversion rate. When the liquid hourly space velocity satisfy the conditions of 0.20 to 0.80 $h^1$, a cyclic ketone selectivity of 60% or more and a by-product yield less than 10% may be simultaneously satisfied, but the values are not limited thereto.

When the reaction in Step (ii) is performed by a continuous-type process, the product yield is relatively increased, and the process cost may be reduced compared to a batch-type process which requires a filtration process for increasing the temperature, cooling the reactor and recovering the catalyst at each batch. When a catalyst in the related art is used, stability is insufficient when the catalyst is used under high temperature conditions or for a long time, so it is difficult to apply a continuous-type process, but the difficulty can be solved using the catalyst molded body.

After Step (ii), it is possible to further include isolating cyclic ketone from the product in Step (iii). The isolation may isolate cyclic ketone, recycled raw materials and by-products by combining known various methods, for example, various methods such as filtration, distillation, concentration under reduced pressure, layer separation, adsorption, absorption, and extraction.

The raw material isolated in Step (iii) may be used in mixture with the reactant in Step (i) and recycled.

For example, Step (iii) may remove water by layer separating the product and isolate cyclic ketone, recycled raw materials and by-products by distillation. Since the catalyst molded body has sufficient stability even when distilled recycled raw materials including impurities are used, cyclic ketone may be produced by applying a recirculation flow as described above.

Hereinafter, the examples of the present invention will be described in more detail. However, the following experimental results describe only representative experimental results among the above-mentioned examples, and the scope and contents of the present invention should not be interpreted as being reduced or limited by the examples, and the like. The effects of each of various embodiments of the present invention, which are not explicitly set forth below, will be described in detail in a corresponding section.

Preparation Example

A mixed powder was produced by mixing a magnesium-aluminum oxide catalyst powder, an inorganic binder and an organic binder. An aqueous solution of the mixed powder mixed with an enhancer and distilled water was added thereto, extruded, and then primarily dried at 25° C. for 24 hours. After secondary drying was performed at 105° C. for 12 hours, a catalyst molded body was produced by firing the resulting product at 500° C. for 4 hours to remove water and the organic binder.

Example 1

During the production of isophorone using acetone by producing the catalyst powder by a known co-precipitation method, characteristics of the catalyst molded body according to the magnesium-aluminum molar ratio (Mg/Al) were confirmed, and the results are shown in the following Table 1. All the remaining conditions were equally maintained.

TABLE 1

| Classification | Example 1-1 | Example 1-2 | Example 1-3 | Example 1-4 |
|---|---|---|---|---|
| Mg/Al molar ratio | 1.0 | 2.5 | 3.0 | 3.5 |
| Acetone conversion rate (%) | 28.4 | 23.7 | 30.9 | 21.3 |
| IPH selectivity (%) | 64.2 | 65.8 | 68.4 | 57.5 |
| IPH + MO selectivity (%) | 75.4 | 77.8 | 75.0 | 82.5 |
| By-product selectivity (%) | 24.6 | 22.2 | 25.0 | 17.5 |
| IPH yield (%) | 18.2 | 15.6 | 21.1 | 12.3 |
| IPH + MO yield (%) | 21.4 | 18.5 | 23.2 | 17.6 |
| By-product yield (%) | 7.0 | 5.3 | 7.7 | 3.7 |

Referring to Table 1, the catalyst molded body had a 2 to 4-fold higher IPH yield compared to the by-product yield, and thus minimized the production of by-products, and could produce cyclic ketone. It can be confirmed that Examples 1-1 to 1-3 satisfying a Mg/Al molar ratio of 1.0 to 3.0 have an IPH selectivity of 60% or more, which is excellent, and both the acetone conversion rate and the IPH selectivity are sharply reduced around a molar ratio of 3.0 to 3.5.

Example 2

The characteristics of the catalyst molded body were confirmed while varying the type, content and molding equipment of the inorganic binder, and the results are shown in the following Tables 2 and 3. All the remaining conditions were equally maintained.

TABLE 2

| Classification | Comparative Example 2-1 | Comparative Example 2-2 | Example 2-1 | Example 2-2 | Example 2-3 | Example 2-4 |
|---|---|---|---|---|---|---|
| Inorganic binder | — | 5 wt % of MgO | 2 wt % of CaO | 5 wt % of CaO | 10 wt % of CaO | 5 wt % of $Al_2O_3$ |
| Acetone conversion rate (%) | 44.7 | 40 | 52.9 | 41.6 | 48.9 | 50.1 |
| IPH selectivity (%) | 64.8 | 64.1 | 56.9 | 65.5 | 56.3 | 59.1 |
| IPH + MO selectivity (%) | 68.4 | 68.7 | 59.8 | 69.5 | 60 | 61.4 |
| By-product selectivity (%) | 31.6 | 31.3 | 40.2 | 30.5 | 40 | 38.6 |
| IPH yield (%) | 29 | 25.6 | 30.2 | 27.3 | 27.6 | 29.6 |
| IPH + MO yield (%) | 30.6 | 27.5 | 31.7 | 29 | 29.4 | 30.8 |
| By-product yield (%) | 14.2 | 13.5 | 21.3 | 12.7 | 19.6 | 19.3 |
| Compressive strength (N) | — | — | 15 | 10 | 65 | 40 |

Referring to Table 2, Comparative Example 2-1 including no inorganic binder or Comparative Example 2-2 including magnesium oxide as the inorganic binder had an insufficient compressive strength due to the insufficient binding force between mixed powders, but Examples 2-1 to 2-4 including potassium oxide or aluminum oxide as the inorganic binder had a high compressive strength of 10 N or more, and thus can be applied to a fixed-bed catalyst reactor. In particular, Example 2-2 in which 5 wt % of calcium oxide was added had high IPH selectivity while having a low by-product yield.

TABLE 3

| Classification | Comparative Example 2-1 | Example 2-2 | Example 2-5 | Example 2-6 | Example 2-7 | Example 2-8 |
|---|---|---|---|---|---|---|
| Binder/process | — | 5 wt % of CaO | 5 wt % of CaO/press | 5 wt % of CaO/firing | 5 wt % of CaO + 5 wt % of $Al_2O_3$ | 5 wt % of CaO + 10 wt % of $Al_2O_3$ |
| Acetone conversion rate (%) | 44.7 | 41.6 | 49.9 | 53.8 | 50.2 | 46 |
| IPH selectivity (%) | 64.8 | 65.5 | 61.5 | 55.5 | 61.1 | 62.3 |
| IPH + MO selectivity (%) | 68.4 | 69.5 | 64 | 58.4 | 63.7 | 65.8 |
| By-product selectivity (%) | 31.6 | 30.5 | 36 | 41.6 | 36.3 | 34.2 |
| IPH yield (%) | 29 | 27.3 | 30.7 | 29.9 | 30.7 | 28.6 |
| IPH + MO yield (%) | 30.6 | 29 | 31.9 | 31.4 | 32 | 30.2 |
| By-product yield (%) | 14.2 | 12.7 | 18 | 22.4 | 18.2 | 15.7 |
| Compressive strength (N) | — | 10 | 26 | 18 | 33 | 33 |

Referring to Table 3, Examples 2-5 and 2-6, in which the inorganic binder was included and pressure molding was performed by a roller press or a firing process was applied, had a remarkably improved compressive strength and an increased IPH yield compared to Example 2-2. In addition, Examples 2-7 and 2-8, in which calcium oxide and aluminum oxide were combined as an inorganic binder, were excellent in IPH yield and compressive strength, and simultaneously could minimize an increase in by-product yield.

Example 3

The characteristics of the catalyst molded body were confirmed while varying the type and content of the organic binder, and the results are shown in the following Table 4. All the remaining conditions were equally maintained.

TABLE 4

| Classification | Comparative Example 3-1 | Example 3-1 | Example 3-2 | Example 3-3 | Example 3-4 |
|---|---|---|---|---|---|
| Organic binder | 5 wt % of MC | 1 wt % of MC | 3 wt % of MC | 1 wt % of CMC | 1 wt % of AA |
| Acetone conversion rate (%) | — | 46 | 44.5 | 46 | 51.5 |
| IPH selectivity (%) | — | 62.3 | 63.5 | 62.8 | 58.7 |
| IPH + MO selectivity (%) | — | 65.8 | 67.4 | 66.5 | 61.4 |
| By-product selectivity (%) | — | 34.2 | 32.6 | 33.5 | 38.6 |

TABLE 4-continued

| Classification | Comparative Example 3-1 | Example 3-1 | Example 3-2 | Example 3-3 | Example 3-4 |
|---|---|---|---|---|---|
| IPH yield (%) | — | 28.6 | 28.2 | 28.9 | 30.2 |
| IPH + MO yield (%) | — | 30.2 | 30 | 30.6 | 31.6 |
| By-product yield (%) | — | 15.7 | 14.5 | 15.4 | 19.9 |
| Compressive strength (N) | 17 | 33 | 26 | 33 | 32 |

MC: hydroxymethyl cellulose,
CMC: carboxymethyl cellulose sodium salt,
AA: acetic acid Referring to Table 4, it was difficult to apply Comparative Example 3-1 in which the content of the organic binder was 5 wt % because the compressive strength was significantly reduced and the organic binder was not sufficiently removed from the catalyst molded body, but Examples 3-1 to 3-4, in which 1 to 3 wt % of the organic binder was included, could improve the IPH yield and compressive strength.

Example 4

The characteristics of the catalyst molded body were confirmed while varying the type and content of the enhancer and distilled water, and the results are shown in the following Table 5. All the remaining conditions were equally maintained.

TABLE 5

| Classification | Example 4-1 | Example 4-2 | Example 4-3 | Example 4-4 | Example 4-5 |
|---|---|---|---|---|---|
| Enhancer | — | 0.25 wt % of NaOH | 0.5 wt % of NaOH | 1.0 wt % of NaOH | 0.25 wt % of KOH |
| Acetone conversion rate (%) | 46 | 42 | 41.1 | 34.2 | 44.7 |
| IPH selectivity (%) | 62.8 | 63.1 | 62.3 | 61.7 | 63.1 |
| IPH + MO selectivity (%) | 66.5 | 67.6 | 67 | 69.8 | 66.7 |
| By-product selectivity (%) | 33.5 | 32.4 | 33 | 30.2 | 33.3 |
| IPH yield (%) | 28.9 | 26.5 | 25.6 | 21.1 | 28.2 |
| IPH + MO yield (%) | 30.6 | 28.4 | 27.5 | 23.9 | 29.8 |
| By-product yield (%) | 15.4 | 13.6 | 13.5 | 10.3 | 14.9 |
| Compressive strength (N) | 33 | 39 | 39 | 35 | 50 |

Referring to Table 5, Examples 4-2 to 4-5, in which sodium hydroxide or calcium hydroxide was included as an enhancer, had a reduced by-product yield and an improved compressive strength.

Example 5

The stability of the catalyst molded body during a continuous-type reaction in a fixed-bed catalyst reactor was confirmed. A schematic view of the fixed-bed catalyst reactor is illustrated in FIG. 2.

Figure 3:
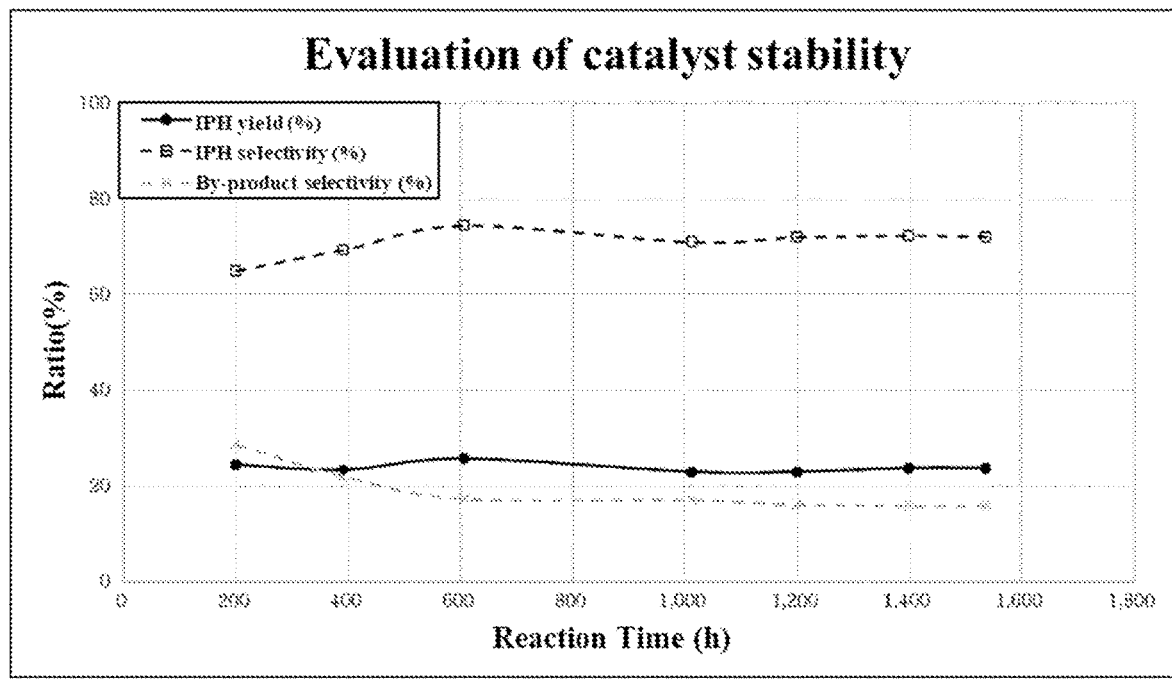
FIG. 3 illustrates the experimental results confirming the long-term stability of the catalyst molded body according to the present specification.

The catalyst molded body was reacted by introducing only pure acetone under conditions of a reaction temperature of 285° C., a reaction pressure of 1 barg, and a LHSV of 0.20/h, and the results are illustrated in FIG. 3.

Figure 4:
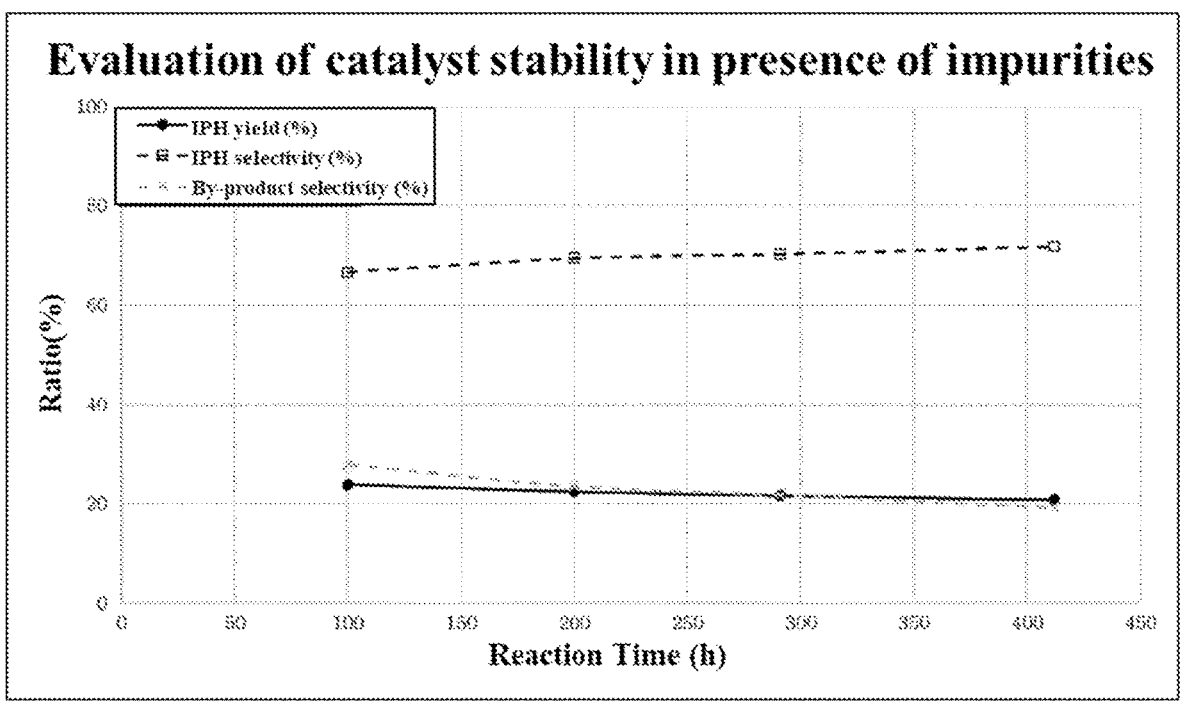
FIG. 4 illustrates the experimental results confirming the stability of the catalyst molded body according to the present specification in the presence of impurities.

In addition, in order to confirm stability during the application by recirculating acetone and mesityl oxide through a distillation column in the reactor, the effect of the catalyst molded body on impurities was confirmed by introducing acetone 96%, mesityl oxide 1.6%, tertiary-methylbenzene 0.1% and water 1.3%, and the results are shown in FIG. 4.

Referring to FIG. 3, it could be confirmed that the catalyst molded body had excellent stability because the IPH yield was not reduced even when the reaction was performed for 1,500 hours or more. Furthermore, referring to FIG. 4, the catalyst molded body is excellent in stability even in the presence of impurities, so the activity was not significantly reduced even though acetone was recirculated.

The above-described description of the present invention is provided for illustrative purposes, and a person skilled in the art to which the present invention pertains will understand that the present invention can be easily modified into other specific forms without changing the technical spirit or essential features of the present invention. Therefore, it should be understood that the above-described embodiments are only illustrative in all aspects and not restrictive. For example, each constituent element which is described as a singular form may be implemented in a distributed form, and similarly, constituent elements which are described as being distributed may be implemented in a combined form.

The scope of the present invention is represented by the claims to be described below, and it should be interpreted that the meaning and scope of the claims and all the changes or modified forms derived from the equivalent concepts thereto fall within the scope of the present invention.

What is claimed is:

1. A method for producing a catalyst molded body for producing cyclic ketone, the method comprising: (a) producing a mixed powder comprising a catalyst powder and a binder; (b) producing a slurry by mixing a first aqueous solution with the mixed powder; and (c) molding and heat-treating the slurry to obtain the catalyst molded body, wherein
   the catalyst powder comprises oxides of magnesium and aluminum, and
   the first aqueous solution comprises alkali hydroxide in an amount of 0.1 to 1 part by weight based on 100 parts by weight of the catalyst molded body.

2. The method of claim 1, wherein the catalyst powder further comprises at least one oxide selected from the group consisting of manganese, iron, cobalt, nickel, copper and zinc.

3. The method of claim 2, wherein the catalyst powder has a molar ratio (Mg/Al) of magnesium and aluminum of 1.0 to 5.0.

4. The method of claim 1, wherein the binder comprises an inorganic binder in an amount of 1 to 20 parts by weight based on 100 parts by weight of the catalyst molded body.

5. The method of claim 1, wherein the binder comprises an organic binder in an amount of 0.1 to 4.5 parts by weight based on 100 parts by weight of the catalyst molded body.

\* \* \* \* \*